US010936998B2

(12) United States Patent
Bidadi et al.

(10) Patent No.: US 10,936,998 B2
(45) Date of Patent: *Mar. 2, 2021

(54) METADATA-BASED CHAT WIZARD

(71) Applicant: ADP, LLC, Roseland, NJ (US)

(72) Inventors: Ashish Bidadi, New York, NY (US);
Darshan Kapadia, New York, NY (US); Amit Maimon, New York, NY (US); Lohit J. Sarma, New York, NY (US); Robert Tucker, New York, NY (US); Tom Tytunovich, New York, NY (US); Patrick Quinn, New York, NY (US); Christopher Fahey, New York, NY (US); Ryan Bannon, New York, NY (US)

(73) Assignee: ADP, LLC, Roseland, NJ (US)

( * ) Notice: Subject to any disclaimer, the term of this patent is extended or adjusted under 35 U.S.C. 154(b) by 396 days.

This patent is subject to a terminal disclaimer.

(21) Appl. No.: 15/940,836

(22) Filed: Mar. 29, 2018

(65) Prior Publication Data

US 2019/0303873 A1 Oct. 3, 2019

(51) Int. Cl.
*G06Q 10/10* (2012.01)
*G06Q 10/08* (2012.01)
(Continued)

(52) U.S. Cl.
CPC .......... *G06Q 10/105* (2013.01); *H04L 51/02* (2013.01); *H04L 51/046* (2013.01); *H04L 51/24* (2013.01)

(58) Field of Classification Search
CPC .... G06Q 10/105; G06Q 10/0631; G06F 8/42; H04L 51/18; H04L 51/046; H04L 51/24; H04L 51/02
(Continued)

(56) References Cited

U.S. PATENT DOCUMENTS 8,250,192 B2* 8/2012 Bowerman ........... G06F 15/173
709/223
9,396,232 B1* 7/2016 Kapoor .............. G06Q 10/1091
(Continued)

OTHER PUBLICATIONS

Office Action, dated Jun. 12, 2020, regarding U.S. Appl. No. 15/961,673, 13 pages.
(Continued)

*Primary Examiner* — Jonathan P Ouellette
(74) *Attorney, Agent, or Firm* — Yee & Associates, P.C.

(57) ABSTRACT

A method, computer system, and computer program product digitally manipulate a human resources workflow on a mobile device. A selection of a human resources operation is received from a mobile application executing on the mobile device; a business rule corresponding to the human resources operation is identified. The business rule comprises a plurality of linked metadata objects forming a syntax tree. The plurality of linked metadata objects is interpreted to implement the business rule, Interpreting comprises sending a first set of chat messages that request input for the plurality of linked metadata objects, and receiving a second set of chat messages that provide the requested input. The human resources operation is performed according to the business rule, generating a workflow stage notification, and publishing the workflow stage notification to a set of mobile devices for display on a timeline of the mobile application.

21 Claims, 12 Drawing Sheets

(51) Int. Cl.
*G06Q 10/00* (2012.01)
*G06Q 30/02* (2012.01)
*G06Q 30/08* (2012.01)
*H04L 12/58* (2006.01)

(58) Field of Classification Search
USPC .......................................... 705/1.1–912, 320
See application file for complete search history.

(56) References Cited

U.S. PATENT DOCUMENTS

| | | | | |
|---|---|---|---|---|
| 2007/0061266 | A1* | 3/2007 | Moore | G16H 40/20 705/51 |
| 2009/0064280 | A1* | 3/2009 | Babeanu | G06Q 10/06 726/3 |
| 2014/0280370 | A1* | 9/2014 | Oberle | G06F 8/51 707/803 |
| 2014/0351352 | A1* | 11/2014 | Degaugue | G06Q 30/0613 709/206 |
| 2016/0062753 | A1* | 3/2016 | Champagne | G06F 8/51 717/137 |
| 2018/0157721 | A1* | 6/2018 | Khaitan | G06F 16/3329 |
| 2019/0073197 | A1* | 3/2019 | Collins | G06F 3/0486 |
| 2019/0215283 | A1* | 7/2019 | Nahum | G06F 3/16 |
| 2019/0236134 | A1* | 8/2019 | Galitsky | G06F 16/35 |
| 2019/0268288 | A1* | 8/2019 | Chandra | H04L 51/02 |

OTHER PUBLICATIONS

Final Office Action, dated Jul. 23, 2020, regarding U.S. Appl. No. 15/961,673, 17 pages.
Notice of Allowance, dated Nov. 4, 2020, regarding U.S. Appl. No. 15/961,673, 17 pages.

\* cited by examiner

METADATA-BASED CHAT WIZARD

BACKGROUND INFORMATION

1. Field

The present disclosure relates to improving the speed of operation of a computer by using a metadata-based human resources management system which avoids using a compiler to generate executable code.

2. Background

Increasingly, businesses rely on business rule interpreters to conduct Internet-based business, or to generate browser-based software programs for others to use in the conduct of business. However, such programs can be complex and can be undesirably slow to compile and/or execute in real-time, especially on a web browser when communication with a remote computer is desirable or necessary. Thus, solutions for increasing the speed of operation of a computer to create and execute business rules are desirable.

SUMMARY

The illustrative embodiments provide for a method for digitally manipulating a human resources workflow on a mobile device. A first illustrative embodiment provides a computer system receives a selection of a human resources operation from a mobile application executing on the mobile device. The computer system identifies a business rule corresponding to the human resources operation, wherein the business rule comprises a plurality of linked metadata objects forming a syntax tree. The computer system interprets the plurality of linked metadata objects to implement the business rule. Interpreting the plurality of linked metadata objects comprises sending a first set of chat messages to the mobile device that request input for the plurality of linked metadata objects, and receiving a second set of chat messages from the mobile device that provide the requested input. The computer system performs the human resources operation according to the business rule. Performing the human resources operation comprises generating a workflow stage notification, and publishing the workflow stage notification to a set of mobile devices for display on a timeline of the mobile application.

Another illustrative embodiment provides a computer system comprising a hardware processor and a business rule system in communication with the hardware processor. The business rule system is configured to receive a selection of a human resources operation from a mobile application executing on a mobile device. The business rule system is further configured to identify a business rule corresponding to the human resources operation. The business rule comprises a plurality of linked metadata objects forming a syntax tree. The business rule system is further configured to interpret the plurality of linked metadata objects to implement the business rule. Interpreting the plurality of linked metadata objects comprises sending a first set of chat messages to the mobile device that request input for the plurality of linked metadata objects, and receiving a second set of chat messages from the mobile device that provide the requested input. The business rule system is further configured to perform the human resources operation according to the business rule. Performing the human resources operation comprises generating a workflow stage notification, and publishing the workflow stage notification to a set of mobile devices for display on a timeline of the mobile application.

Yet another illustrative embodiment provides a computer program product for digitally manipulating a human resources workflow on a mobile device. The computer program product comprises a non-transitory computer readable storage media, and program code, stored on the computer readable storage media. The program code includes code for receiving a selection of a human resources operation from a mobile application executing on the mobile device. The program code further includes code for identifying a business rule corresponding to the human resources operation, wherein the business rule comprises a plurality of linked metadata objects forming a syntax tree. The program code further includes code for implement the business rule. The program code for interpreting the plurality of linked metadata objects comprises program code for sending a first set of chat messages to the mobile device that request input for the plurality of linked metadata objects, and program code for receiving a second set of chat messages from the mobile device that provide the requested input. The program code further includes code for performing the human resources operation according to the business rule. The program code for performing the human resources operation comprises program code for generating a workflow stage notification, and program code for publishing the workflow stage notification to a set of mobile devices for display on a timeline of the mobile application.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
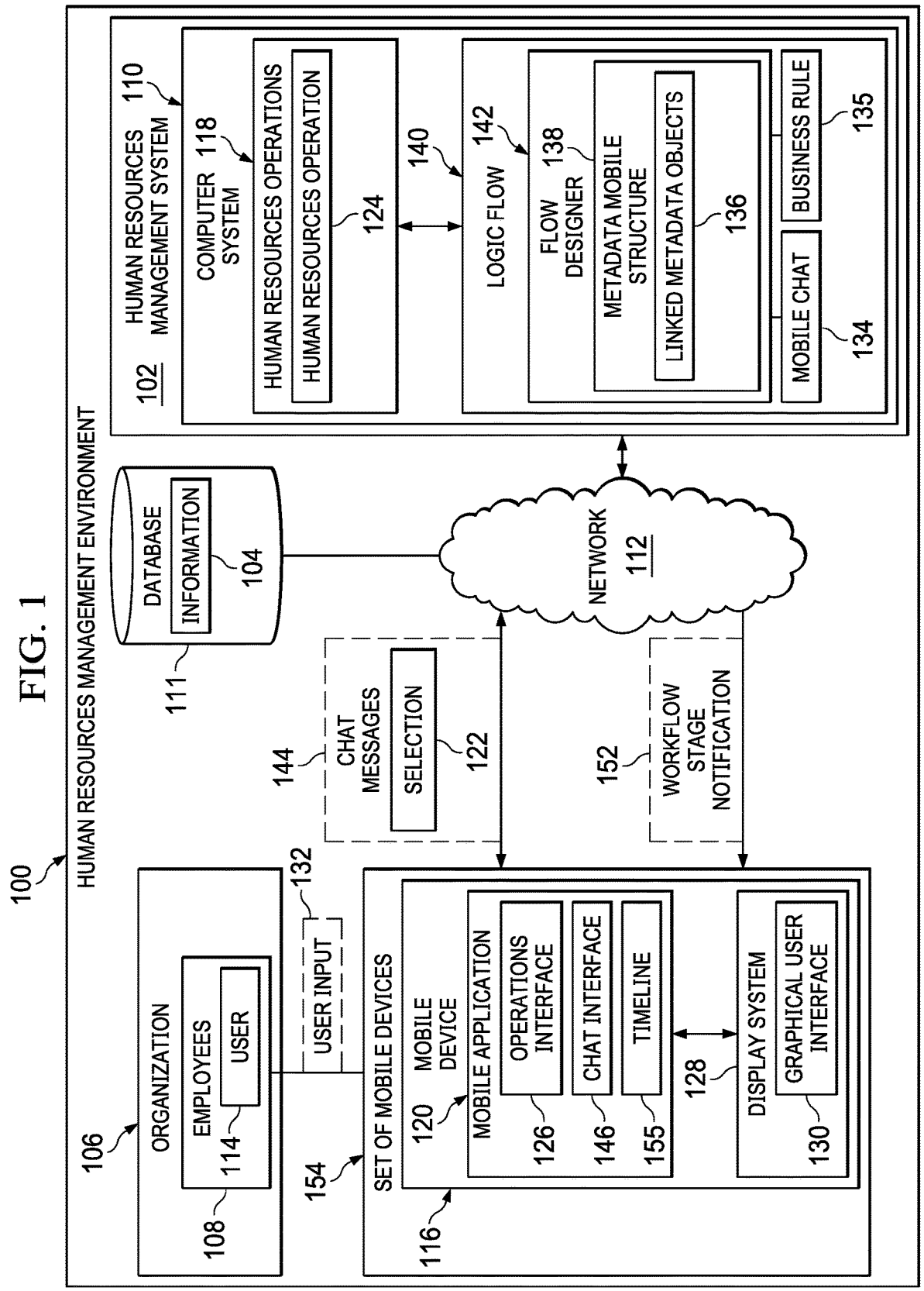
FIG. 1 is an illustration of a block diagram of a human resources management environment in accordance with an illustrative embodiment.

The illustrative embodiments recognize and take into account that current human resource systems are undesirably slow in terms of assembling, compiling, and/or executing business rules for the performance of human resources operations. As used herein, a "business rule" is computer code executable only by a computer, to produce a change in a computer, a server computer, at a remote client computer, or at a local client computer based on input from a server computer. While the term "computer rule" could be substituted for "business rule," it is customary in the business world to refer to computer rules that are used to aid in electronic services used in support of the business as "business rules." Thus, the term "business rule" should not be interpreted as a human-implemented procedure in a business environment, but rather strictly as an information technology implementation of hardware or software, as defined above.

As used herein, a "business rule interpreter" is hardware or software which is used to interpret or execute business rules in a business system. Typically, a "business rule interpreter" is software residing in a Web browser on the client computer. However, the illustrative embodiments are not necessarily limited to only client computers or Web browsers.

The illustrative embodiments contemplate that many different business rule system architectures and business rule interpreters are possible. The illustrative embodiments provide for business rule systems which dramatically increase the speed of the operation of computers implementing business rules.

Thus, the illustrative embodiments provide for a business rule interpreter designed for a domain-specific language entirely composed of metadata objects. The business rule interpreter of the illustrative embodiments may take the form of an abstract syntax tree (AST) interpreter having a structure composed of metadata itself. The abstract syntax tree (AST) interpreter requires no complier because the constructs from which a metadata object is composed of are well-defined when they are constructed. Thus, the compilation phase that precedes the execution of code under ordinary circumstances is non-existent and, hence, avoided. The tokenization and parsing that would occur becomes the translation of the user input into the well-defined metadata objects that result in the composition of the user-selected block types and properties. As a result, executable code is not necessary.

In design, the business rule interpreter of the illustrative embodiments may be defined as a set of composable executor functions, each of which defines a single, atomic code construct as defined by the behavior belonging to the business rule domain-specific language. The atomic code constructs may be blocks visually presented to a user on a browser, which the user combines in an input area of a display monitor. Combinations of these atomic code constructs generate combinations of executor functions, which the abstract syntax tree (AST) described above interprets and then implements in the browser. Hence compilation and executable code are entirely avoided, resulting in a dramatic increase in speed of the computer. The increase of the speed has been measured to be ten times faster, or more, compared to prior business rule interpreters which rely on compilation, executable code, and runtime of that executable code.

The executor functions of the business rule interpreter all operate inside of a context defined at a beginning of the business rule execution step, which is the target object for all symbols in the course of a business rule execution as well as for all input to and output from the business rule itself. The different permutations of the compositions of these functions, as well as differentiated input, are what enable the execution of different business rule behaviors at runtime. In essence, the business rules of the illustrative embodiments execute from the abstract syntax tree interpreter from the runtime metadata definition of the business rule alone.

The illustrative embodiments also recognize and take into account that prior business rule systems were not as maintainable as desired and not as secure as desired, in addition to not being as fast as desired. The illustrative embodiments recognize and take into account that the illustrative embodiments increase security through the use of pre-defined executor functions defined by metadata. The illustrative embodiments also recognize and take into account that the illustrative embodiments are easily maintainable simply by defining additional executor functions, or by modifying the definitions of existing executor functions. Hence, the illustrative embodiments represent a highly significant improvement in the art of business system architectures.

Stated differently, the business rule interpreter of the illustrative embodiments is a code interpreter designed for a domain-specific language entirely composed of metadata objects. This compiler takes the form of an abstract syntax tree (AST) interpreter with the exception that the abstract syntax tree (AST) structure is the composed metadata itself. This structure requires no compilation because the constructs from which the metadata objects are composed of are well-defined when they are constructed. So, the compilation phase that precedes the execution of code in the business rule interpreter is non-existent. The tokenization and parsing that would occur would be the translation of user input into well-defined metadata objects which would result in the composition of the user selected block types and properties.

In design, the business rule interpreter is a set of infinitely-composable executor functions, each of which defines a single, atomic code construct as defined by the behavior (and actual visual "blocks") belonging to the business rule domain-specific language. These functions all operate inside of a context defined at the beginning of the business rule execution step which is the target object for all symbols defined in the course of the business rule execution, as well as for all input to and output from the business rule itself. The different permutations of the compositions of these functions, as well as differentiated input, are what enable the execution of the different business rule behaviors at runtime.

The architecture described in this document assumes conditions about the environment in which it is run, as well as the business decisions driving the platform in which it is used. The metadata passed into the business rule interpreter is dynamic. Thus, the single source of truth associated with the metadata provided to the interpreter is the actual metadata provided by the metadata document store. No pre-compilation has occurred on the metadata documents before they have been passed to the interpreter, including contextual overrides.

As indicated above, the illustrative embodiments use executor functions. The executor function is the basic unit of structure and function in the business rule interpreter. It is a singular code point which correlates to business rule metadata object created by the business rule designer, which in turn is manipulated by the user to create desired business rules. An executor can represent as little code as possible to allow rules to be composed. All of the executors in the business rule interpreter take the context of the business rule currently in execution as well as a business rule metadata object entity for a single block inclusive of its children and returns the same context updated with the behavior of the executor itself.

The illustrative embodiments also use "helpers" to implement the business rule systems described herein. The helpers perform similar functionality to executors, executing JAVASCRIPT® against translated business rule metadata objects, with the exception that they do not necessarily take the same arguments or return the same values. All of the executors in the business rule interpreter take the context of the business rule currently in execution, as well as a business rule metadata object entity for a single block inclusive of its children and returns the same context updated with the behavior of the executor itself. The helpers always use a business rule execution context, as well as some other arguments, but not necessarily a business rule metadata object. They can return anything. The distinction between the helpers and other utilities is that the helpers use a business rule execution context or a business rule metadata object whereas the utility functions of executors are generic.

In the business rule systems of the illustrative embodiments, all date types may be transferrable. This fact implies that no matter what type of date identifier is passed, it will be coerced into the same JAVASCRIPT® date type.

In addition, the business rule interpreter accepts International Organization for Standardization (ISO) strings or epoch times as date-like type arguments. However, it assumes that these arguments are always in a universal format. One way to create a date from a business rule is with a "date-manipulation" with type of "create" and this operation will create a UTC date regardless of the time zone of the created date. The only exception to UTC handling of JAVASCRIPT® dates is in the "string-manipulation" block with a "format" type. This block will localize a date before formatting it to the specified format. The reason this procedure is done is that the executor is predominately creating "display" values.

Dates may be returned as International Organization for Standardization (ISO) strings. Output parameters that are of any of the date-like types or dates in notification messages will always be International Organization for Standardization (ISO) strings. If the value associated with an output parameter from a business rule of type "date," "datetime," or "time" happens to be an invalid date, it cannot be converted into an International Organization for Standardization (ISO) string and therefore will return a null value.

With reference now to the figures and, in particular, with reference to FIG. 1, an illustration of a block diagram of a human resources management environment is depicted in accordance with an illustrative embodiment. As depicted, human resources management environment 100 includes human resources management system 102.

Human resources management system 102 may take different forms. For example, human resources management system 102 may be selected from one of an employee information system, a research information system, a sales information system, an accounting system, a payroll system, a human resources system, or some other type of information system that stores and provides access to information 104.

Information 104 can include information about organization 106. Information 104 may include, for example, at least one of information about people, products, research, product analysis, business plans, financials, or other information relating to organization 106 and employees 108. As depicted, information 104 is stored on database 111.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Organization 106 may be, for example, a corporation, a partnership, a charitable organization, a city, a government agency, or some other suitable type of organization. As depicted, organization 106 includes employees 108.

As depicted, employees 108 are people who are employed by or associated with organization 106. For example, employees 108 can include at least one of employees, administrators, managers, supervisors, and third parties associated with organization 106.

Human resources management system 102 may be implemented in computer system 110. Computer system 110 is a physical hardware system and includes one or more data processing systems. When more than one data processing system is present, those data processing systems may be in communication with each other using a communications medium. The communications medium may be a network, such as network 112. The data processing systems may be selected from at least one of a computer, a server computer, a workstation, a tablet computer, a laptop computer, a mobile phone, or some other suitable data processing system.

User 114 uses mobile device 116 to communicate with human resources management system 102 in order to perform one or more of human resources operations 118. Mobile device 116 and human resources management system 102 are connected to one another via network 112.

Network 112 is a communications medium and may include one or more wireless or wired data networks. Network 112 may include one or more of a wireless cellular data network, a local area network, a wide area network, the Internet, an intranet, or other suitable types of networks. For example, mobile device 116 may use a wireless cellular data network, such as code division multiple access (CDMA) or a global system for mobiles (GSM) to access the Internet. Human resources management system 102 may access the Internet via a wired link. In this manner, mobile device 116 is in communication with human resources management system 102 via network 112.

Mobile device 116 comprises physical hardware that is portable, such as a hand-held device. For example, mobile device 116 includes at least one of a laptop computer, a tablet, a mobile phone, such as a cellular or smart phone, or any other suitable type of portable data processing system that can access information 104 over a network, such as network 112. The access may include at least one of reading, writing, modifying, or operating on information 104.

Mobile application 120 is configured to run on mobile device 116. Mobile application 120 may include at least one of a browser, a mobile application, or some other suitable type of application that is configured to receive and display information 104 and interact with user 114. User 114 may use mobile application 120 to perform one or more of human resources operations 118.

In one illustrative embodiment, user 114 may perform one or more of human resources operations 118 by digitally manipulating a human resources workflow on mobile device 116.

Human resources management system 102 receives selection 122 of human resources operation 124 from mobile application 120 executed on mobile device 116. Human resources operation 124 is one of human resources operations 118.

In one illustrative example, human resources management system 102 receives selection 122 based on interaction of user 114 with operations interface 126, displayed on display system 128 in graphical user interface 130. User 114 may interact with graphical user interface 130 through user input 132 generated by one or more user input device, such as, for example, a mouse, a keyboard, a trackball, a touchscreen, a stylus, or some other suitable type of input device.

Human resources management system 102 identifies business rule 135 corresponding to human resources operation 124. As used herein, a "business rule" is computer code executable only by a computer, to produce a change in a computer, a server computer, at a remote client computer, or at a local client computer based on input from a server computer. While the term "computer rule" could be substituted for "business rule," it is customary in the business world to refer to computer rules that are used to aid in electronic services used in support of the business as "business rules." Thus, the term "business rule" should not be interpreted as a human-implemented procedure in a business environment, but rather strictly as an information technology implementation of hardware or software, as defined above.

In one illustrative example, human resources management system 102 enables human resources operation 124 through a plurality of linked metadata objects 136 organized into metadata mobile structure 138. Metadata mobile structure 138 is a tree representation of the abstract syntactic structure of source code, independent of any particular representation or encoding. Each node of the tree denotes a construct occurring in the source code. As opposed to parse trees, typically built by a parser during a source code translation and compiling process, metadata mobile structure 138 can be "abstract" in that it does not represent every detail appearing in the real syntax.

Logic flow 140 interprets the plurality of linked metadata objects 136 to implement business rule 135 using mobile chat 134. Logic flow 140 may be referred to as the engine inside the application. Individual metadata blocks are the basic unit of structure and function in logic flow 140. Logic flow 140 provides design time orchestration and runtime interpretation of metadata mobile structure 138 to implement business rule 135. In one illustrative example, logic flow 140 includes logic for metadata retrieval, resolution, and interpretation, but not compilation.

In this illustrative example, logic flow 140 also includes flow designer 142. Flow designer 142 allows a user to create and organize metadata objects into metadata mobile structure 138. Metadata objects created by flow designer 142 are manipulated by the user to create business rule 135. Metadata blocks, and the underlying executor functions, can represent as little code as possible to allow rules to be composed. All of linked metadata objects 136 take the context of business rule 135 currently in execution, as well as a business rule metadata object entity for a single block inclusive of its children and returns the same context updated with the behavior of the executor itself.

Logic flow 140 may be implemented in software, hardware, firmware, or a combination thereof. When software is used, the operations performed by logic flow 140 may be implemented in program code configured to run on hardware, such as a processor unit. When firmware is used, the operations performed by logic flow 140 may be implemented in program code and data and stored in persistent memory to run on a processor unit. When hardware is employed, the hardware may include circuits that operate to perform the operations in logic flow 140.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In one illustrative example, one or more of the plurality of linked metadata objects 136 may require user input 132 for implementing business rule 135. In this example, when interpreting the plurality of linked metadata objects, logic flow 140 sends chat messages 144 to mobile device 116. In this example, chat messages 144 are a first set of messages that request input needed by one or more of the plurality of linked metadata objects 136 to implement business rule 135.

In one illustrative example, chat messages 144 can take the form of at least one of an icon or a graphic within a graphical user interface, an e-mail, a chat message, or a short messaging service (SMS) message. According to an illustrative embodiment, chat messages 144 can be displayed within chat interface 146 of graphical user interface 130 of mobile device 116.

In one illustrative example, logic flow 140 generates a first set of chat messages 144 according to metadata mobile structure 138 that corresponds to business rule 135. Logic flow 140 interprets the plurality of linked metadata objects 136 to generate chat messages 144 according to metadata mobile structure 138.

In this illustrative example, logic flow 140 interprets linked metadata objects 136 and uses mobile chat 134 to directly generate chat messages requesting input needed by one or more of the plurality of linked metadata objects 136 to implement business rule 135. Mobile chat 134 is one or more metadata objects associated with at least one of linked metadata objects 136. Mobile chat 134 indicates that one or more chat messages 144 should be generated to implement business rule 135.

User 114 may interact with graphical user interface 130 through user input 132 to generate a second set of chat messages 144, providing user input 132 requested by logic flow 140 using mobile chat 134. Logic flow 140 receives the second set of chat messages 144 from mobile device 116, enabling the performance of human resources operation 124 according to business rule 135.

In one illustrative example, performing human resources operation 124 by human resources management system 102 according to business rule 135 includes generating workflow stage notification 152. As used herein, a "workflow" is the sequence of industrial, administrative, or other processes through which human resources operation 124 passes from initiation to completion. A workflow stage is a step in the process of a workflow. Workflow stage notification 152 is a notice to one or more of employees 108 to whom human resources operation 124 is relevant.

In one illustrative example, human resources management system 102 publishes workflow stage notification 152 to set of mobile devices 154. Set of mobile devices 154 can then display workflow stage notification 152 on timeline 155 of mobile application 120. Mobile application 120 can chronologically display workflow stage notification 152 in timeline 155 as one of a set of event cards.

The illustrative example in FIG. 1 and the examples in the other subsequent figures provide one or more technical solutions to overcome a technical problem inherent in the time-consuming translation of metadata and compilation of executable code processes. By avoiding translation of metadata and compilation of executable code, the speed of both rule generation and rule execution is dramatically increased.

In this manner, the use of logic flow 140 has a technical effect of increasing the speed of both the generation and execution of business rule 135. In this manner, human resources operation 124 performed for organization 106 may be performed more efficiently as compared to currently used systems that do not include logic flow 140. For example, business rules and chat flows supporting the performance of operations such as, but not limited to, at least one of hiring, benefits administration, payroll, performance reviews, forming teams for new products, assigning research projects, or other suitable operations for organization 106, can be more quickly and accurately enabled when using logic flow 140.

As a result, computer system 110 operates as a special purpose computer system in which logic flow 140 in computer system 110 enables digitally manipulating a human resources workflow on mobile device 116. Logic flow 140 receives selection 122 of human resources operation 124 from mobile application 120 executing on mobile device 116. Logic flow 140 identifies business rule 135 corresponding to human resources operation 124, wherein business rule 135 is implemented through a plurality of linked metadata objects 136 forming metadata mobile structure 138. Logic flow 140 interprets the plurality of linked metadata objects 136 to implement business rule 135. In interpreting the plurality of linked metadata objects 136, logic flow 140 sends a first set of chat messages 144 to mobile device 116 that requests input for one or more of the plurality of linked metadata objects 136. Logic flow 140 can then receive a second set of chat messages 144 from mobile device 116 that provides the requested input. Logic flow 140 performs human resources operation 124 according to business rule 135. Performing human resources operation 124 comprises generating workflow stage notification 152, and publishing workflow stage notification 152 to set of mobile devices 154 for display on timeline 155 of mobile application 120.

Thus, logic flow 140 transforms computer system 110 into a special purpose computer system as compared to currently available general computer systems that do not have logic flow 140 that implement business rules based linked metadata objects 148 organized into metadata mobile structure 150. Currently used general computer systems do not increase the speed of both rule generation and rule execution by avoiding translation of metadata and compilation of executable code.

Figure 2:
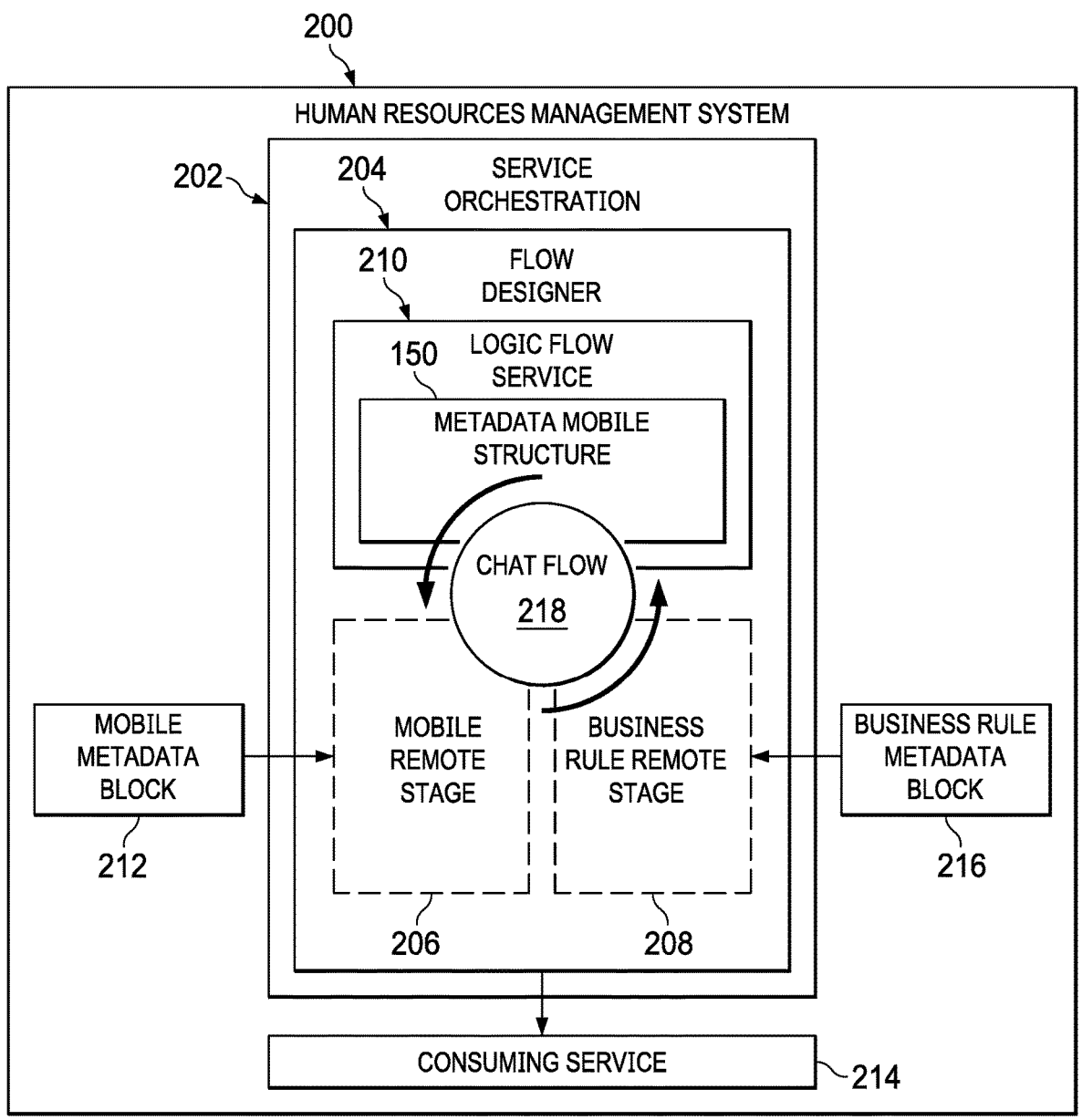
FIG. 2 is an illustration of a block diagram of an architecture of a metadata-based human resources management system in accordance with an illustrative embodiment.

FIG. 2 is an illustration of a block diagram of an architecture of a metadata-based human resources management system depicted in accordance with an illustrative embodiment. Human resources management system 200 is an example of human resources management system 102. Human resources management system 200 is presented as a network-based business system including both server computers and client computers.

Human resources management system 200 includes service orchestration 202. Service orchestration 202 is a client-side or node computer which presents flow designer 204. Flow designer 204 is a user interface (UI) that allows a user to combine blocks, each representing an executor function that is a pre-defined atomic unit of code. Service orchestration 202 may be where the interpreter fetches metadata. It is not necessarily a restful request, but may be any methodology used to provision the metadata used by the business rule interpreter, which is the primary function of mobile remote stage 206 and business rule remote stage 208. After the user has selected the desired atomic units of code, either alone or in combination, logic flow service 210 provides one or more context object identifications to mobile remote stage 206 and business rule remote stage 208, which can be a server-side computer. The identifications are the identifications against which metadata documents can be resolved.

Logic flow service 210 may be referred to as the engine inside the application. Logic flow service 210 may be a wrapper around the interpreter intended to separate the logic of metadata retrieval and resolution, not complication, but duplicating and caching, from the actual metadata interpretation. Logic flow service 210 interprets metadata blocks of metadata mobile structure 150 and generates chat output and business rule output there from.

Mobile remote stage 206 can be implemented as part of mobile chat 134 of FIG. 1. Mobile remote stage 206 is a program that allows communication between logic flow service 210 and mobile chat 134 of FIG. 1. Mobile remote stage 206 "exposes" some internal functions of mobile chat 134 to logic flow service 210 in a limited fashion. Mobile remote stage 206 enables logic flow service 210 to share data with mobile chat 134, and enables mobile chat 134 to take actions on behalf of logic flow service 210.

Mobile remote stage 206 receives interpreted metadata provided from logic flow service 210. Mobile remote stage 206 generates chat output from the interpreted metadata. Chat output is the output provided by mobile chat 134 corresponding to the metadata and input values passed into mobile remote stage 206. Mobile chat 134 sends chat output to mobile device 116 as chat messages, such as chat messages 144 of FIG. 1.

In this illustrative example, a user incorporates mobile metadata block 212 into metadata mobile structure 150. In this manner, mobile metadata block 212 provides additional context for execution of related metadata blocks inclusive of its children, and returns the same context updated with the information received through chat messages 144 of FIG. 1. In this illustrative example, mobile metadata block 212 may indicate chat flow 218 for requesting and receiving information required for execution of related blocks of metadata mobile structure 150.

Chat output is already executable because they are generated from the pre-determined atomic units of code specified by the executor functions selected client-side. Chat output is the output provided by logic flow service 210 to mobile remote stage 206 that corresponds to the interpreted metadata blocks of metadata mobile structure 150 as indicated by mobile metadata block 212.

Business rule remote stage 208 can be implemented as part of business rule 135 of FIG. 1. Business rule remote stage 208 is a program that allows communication between logic flow service 210 and consuming service 214. Business rule remote stage 208 "exposes" some internal functions of consuming service 214 to logic flow service 210 in a limited fashion. Business rule remote stage 208 enables logic flow service 210 to share data with consuming service 214, and enables consuming service 214 to take actions on behalf of, and using data provided by, logic flow service 210.

Business rule remote stage 208 receives interpreted metadata provided from logic flow service 210. Business rule remote stage 208 generates business rule output from the interpreted metadata. Business rule output is the output provided by business rule 135 corresponding to the metadata and input values passed into business rule remote stage 208. Business rule 135 sends business rule output to consuming service 214, enabling consuming service 214 to perform human resources operation 124 of FIG. 1.

In this illustrative example, a user incorporates business rule metadata block 216 into metadata mobile structure 150. In this manner, business rule metadata block 216 provides additional context for execution of related metadata blocks inclusive of its children, and provides business rule output to consuming service 214.

Business rule output is already executable because they are generated from the pre-determined atomic units of code specified by the executor functions selected client-side. Business rule output is the output provided by logic flow service 210 to business rule remote stage 208 that corresponds to the interpreted metadata blocks of metadata mobile structure 150 as indicated by business rule metadata block 216.

Thus, business rule output is provided directly to one or more consuming service 214, which executes the output of business rule remote stage 208. By avoiding translation of metadata and compilation of executable code, the speed of both rule generation and rule execution is dramatically increased.

Consuming service 214 represents a service for performing a human resources operation, such as human resources operation 124 of FIG. 1. Consuming service 214 can be a service that either requested that a business rule be executed, require output therefrom, or combinations thereof. Consuming service 214 can be, but is not necessarily restricted to, a mobile application, such as mobile application 120 of FIG. 1. In another illustrative example, consuming service 214 can be, but is not necessarily restricted to, a human resources application for performing a human resources operation, such as human resources operation 124 of FIG. 1. In one illustrative example, consuming service 214 can be implemented as a webpage.

Human resources management system 200 is a specific implementation of the illustrative embodiments. Thus, human resources management system 200 does not necessarily limit the claimed inventions, or other business rule systems described herein.

Figure 3:
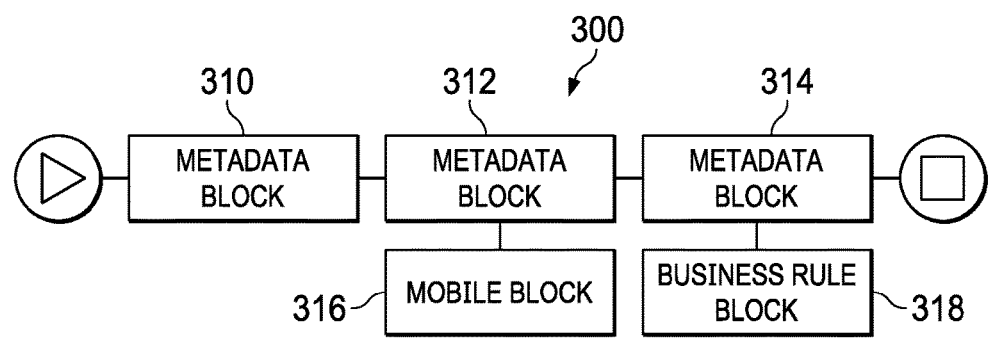
FIG. 3 is an illustration of a block diagram of a metadata mobile structure in accordance with an illustrative embodiment.

With reference next to FIG. 3, an illustration of a block diagram of a metadata mobile structure is depicted in accordance with an illustrative embodiment. Metadata mobile structure 300 is an example of metadata mobile structure 150, shown in block form in FIG. 1.

Metadata mobile structure 300 includes metadata blocks 310, 312, and 314. Metadata blocks 310, 312, and 314 are metadata objects that can be manipulated within flow designer 204 of FIG. 2 to create desired business rules. Each of metadata blocks 310, 312, and 314 correlate to one or more executor functions, which in turn can be interpreted by logic flow service 210 for implementing the corresponding business rule. These functions all operate inside of a context defined at the beginning of the business rule execution step which is the target object for all symbols defined in the course of the business rule execution, as well as for all input to and output from the business rule itself. The different permutations of the compositions of these functions, as well as differentiated input, are what enable the execution of the different business rule behaviors at runtime.

Metadata mobile structure 300 further includes mobile block 316. Mobile block 316 is an example of mobile metadata block 212 of FIG. 2. Mobile block 316 provides additional context for execution of related metadata block 312. Specifically, mobile block 316 may indicate a chat flow, such as chat flow 218 of FIG. 2, for requesting and receiving information required for execution of metadata block 312. Mobile block 316 requests and returns the same context updated with the information received through chat messages 144 of FIG. 1, as provided through mobile remote stage 206 of FIG. 2.

Metadata mobile structure 300 further includes business rule block 318. Business rule block 318 is an example of business rule metadata block 216 of FIG. 2. Business rule block 318 provides additional context for execution of related metadata block 314. Specifically, business rule block 318 may indicate a consuming service for receipt of business rule output provided by related metadata block 314. Business rule block 318 requests and returns information to a consuming service, such as consuming service 214 in FIG. 2, as provided through business rule remote stage 208 of FIG. 2.

Figure 4:
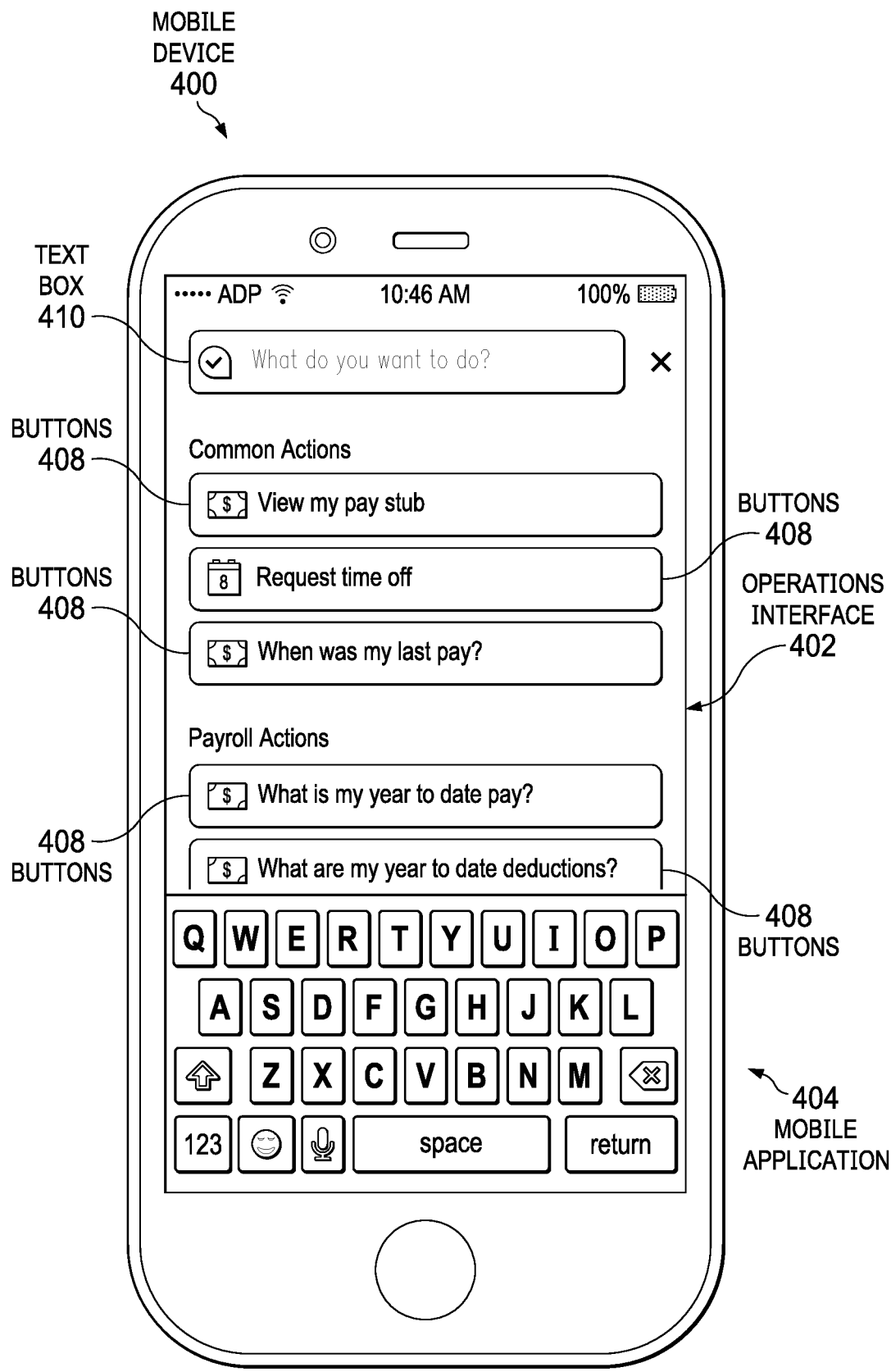
FIG. 4 is an illustration of a mobile device in accordance with an illustrative embodiment.

With reference now to FIG. 4, an illustration of a mobile device is depicted in accordance with an illustrative embodiment. Mobile device 400 is an example of mobile device 116 shown in block form in FIG. 1.

As depicted, mobile device 400 displays operations interface 402 for mobile application 404. Operations interface 402 is an example of operations interface 126, shown in block form in FIG. 1. Operations interface 402 allows a user to select or search for different human resources operations that are supported by and can be performed using mobile application 404. A selection, such as selection 122 of FIG. 1, is generated when a user interacts with one of buttons 408, selecting commonly utilized or frequently accessed human resources operations. The user can also search for and select other human resources operations by interacting with text box 410.

With reference next to FIGS. 5A-H, a sequential series of chat messages in the context of a succession planning human resources operation is depicted in accordance with an illustrative embodiment. Mobile device 500 is an example of mobile device 116, shown in block form in FIG. 1. Chat messages 502-516 are examples of chat messages 144, shown in block form in FIG. 1.

Figure 5B:
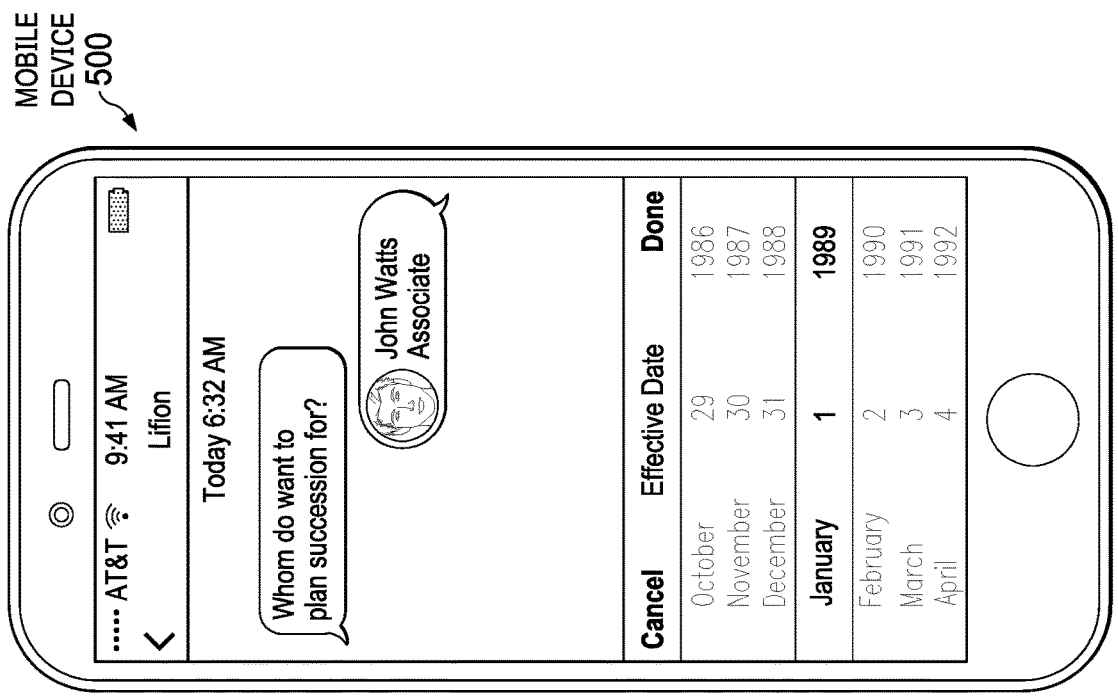
FIGS. 5A-H are a sequential series of chat messages in a context of a succession planning human resources operation in accordance with an illustrative embodiment.
Figure 5A:
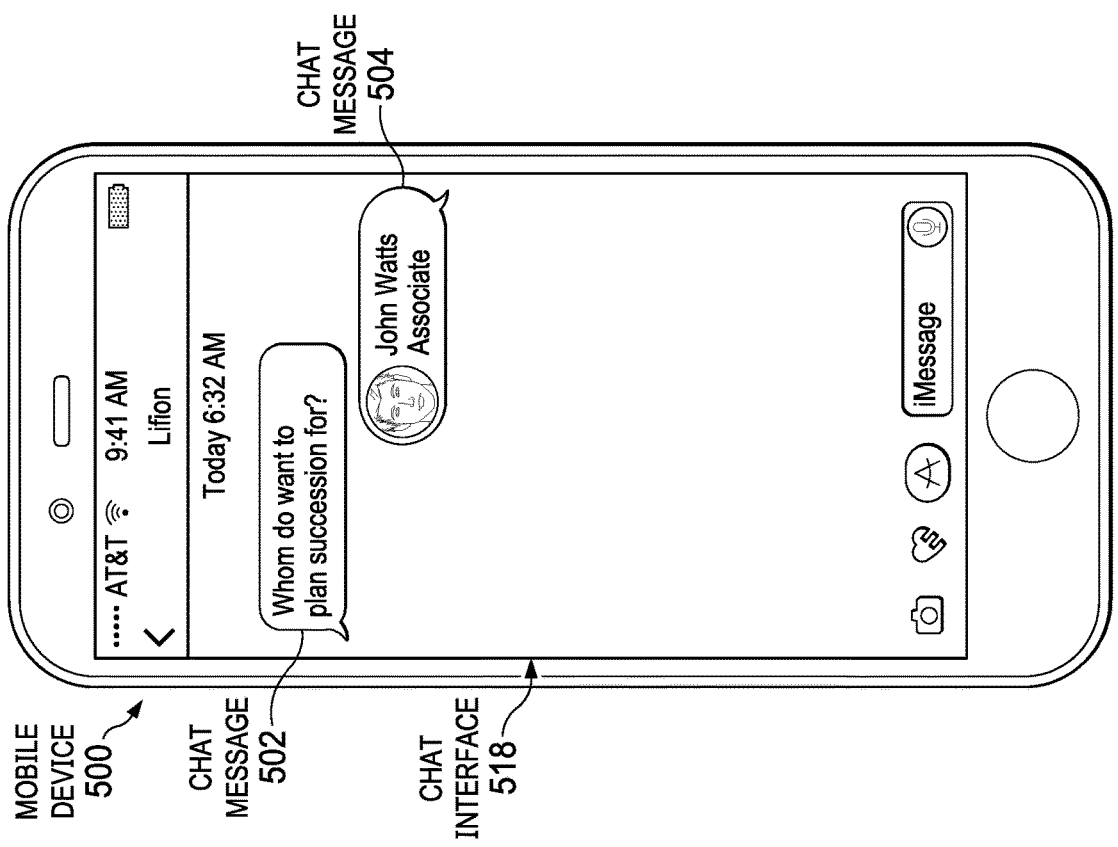
Figure 5D:
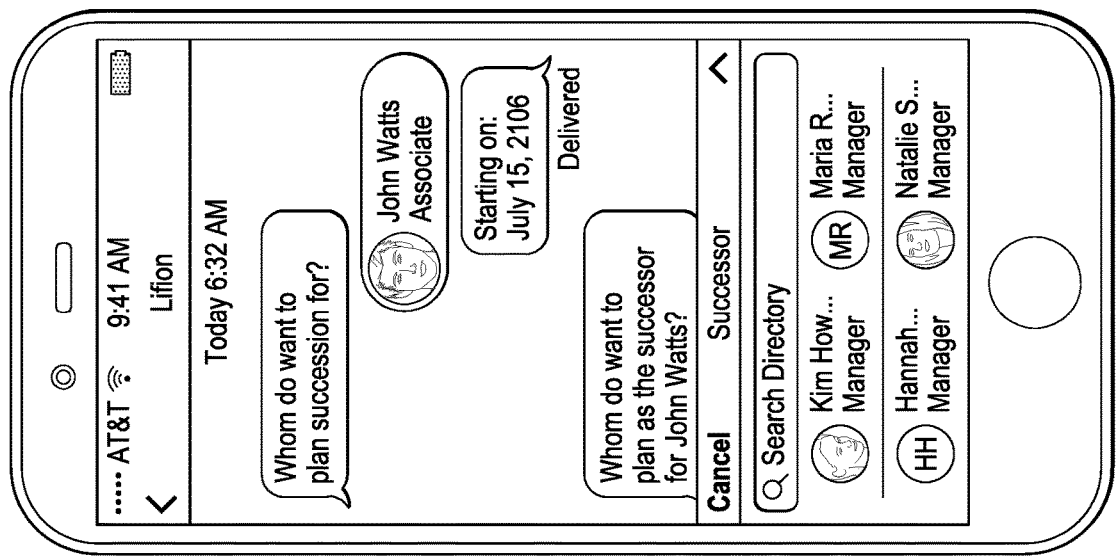
Figure 5C:
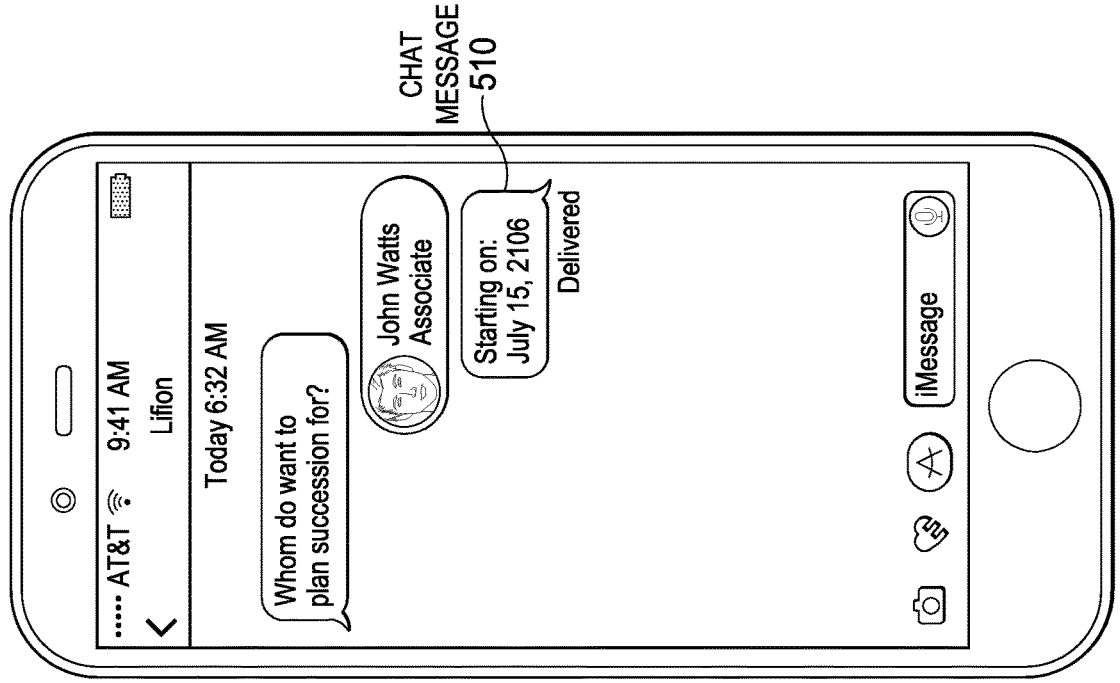
Figure 5F:
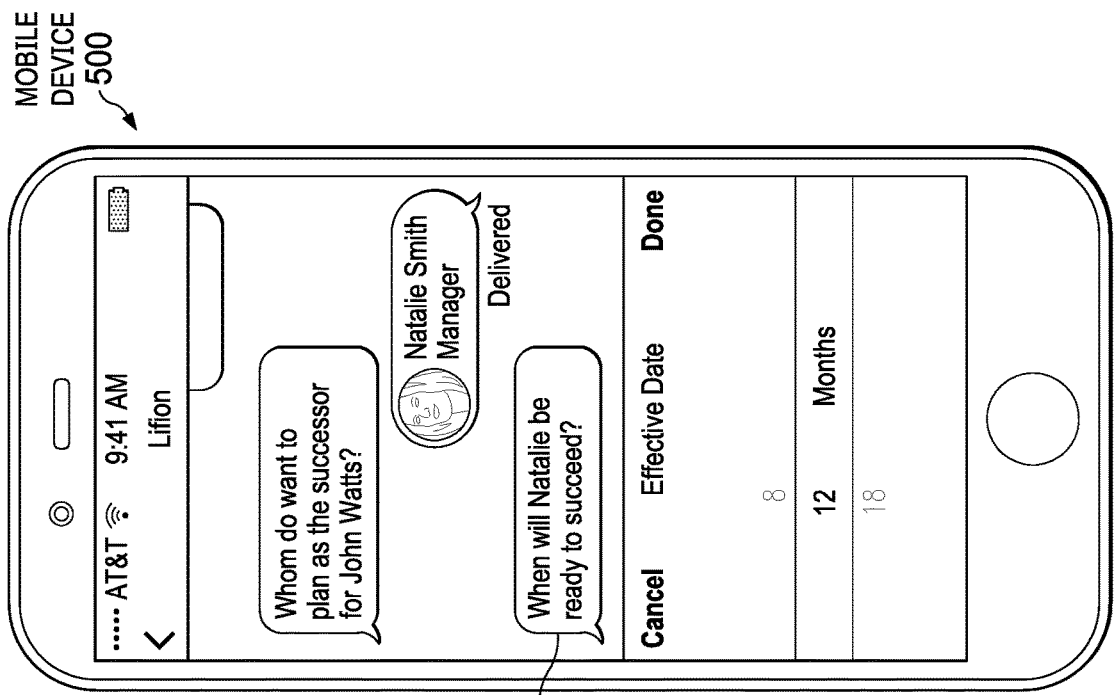
Figure 5E:
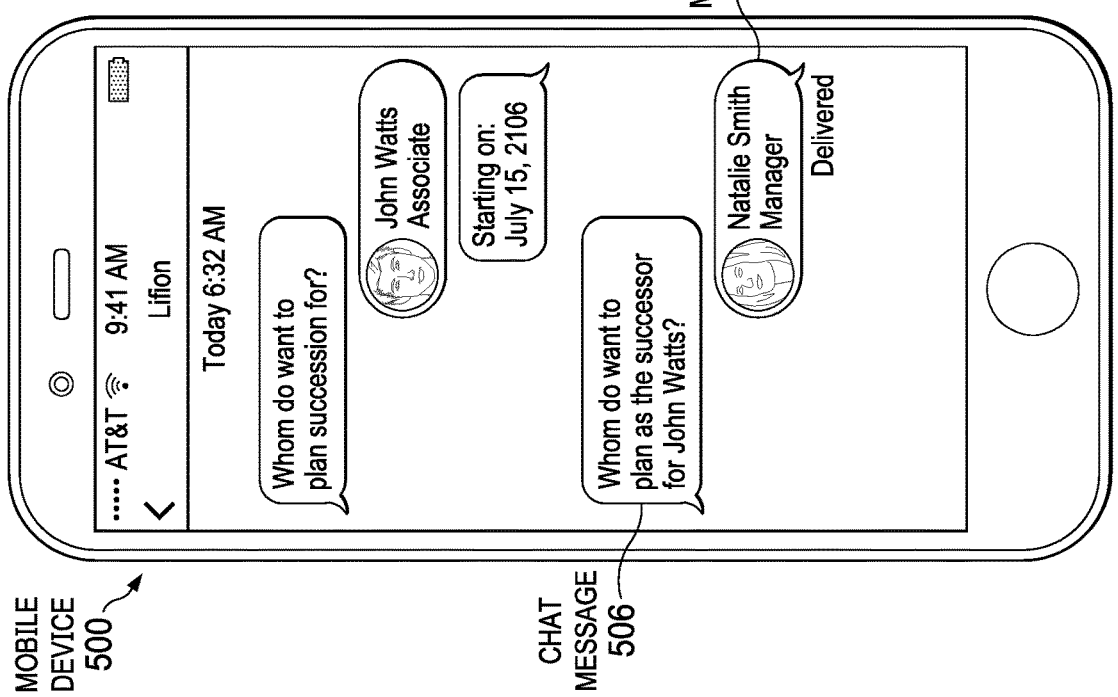
Figure 5H:
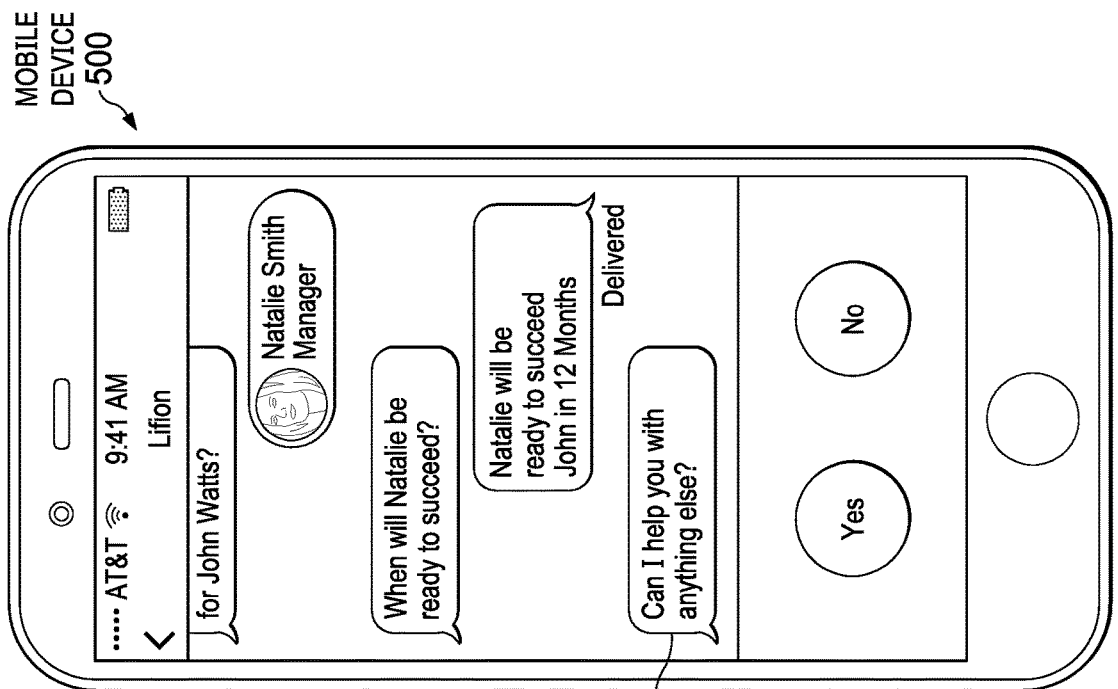
Figure 5G:
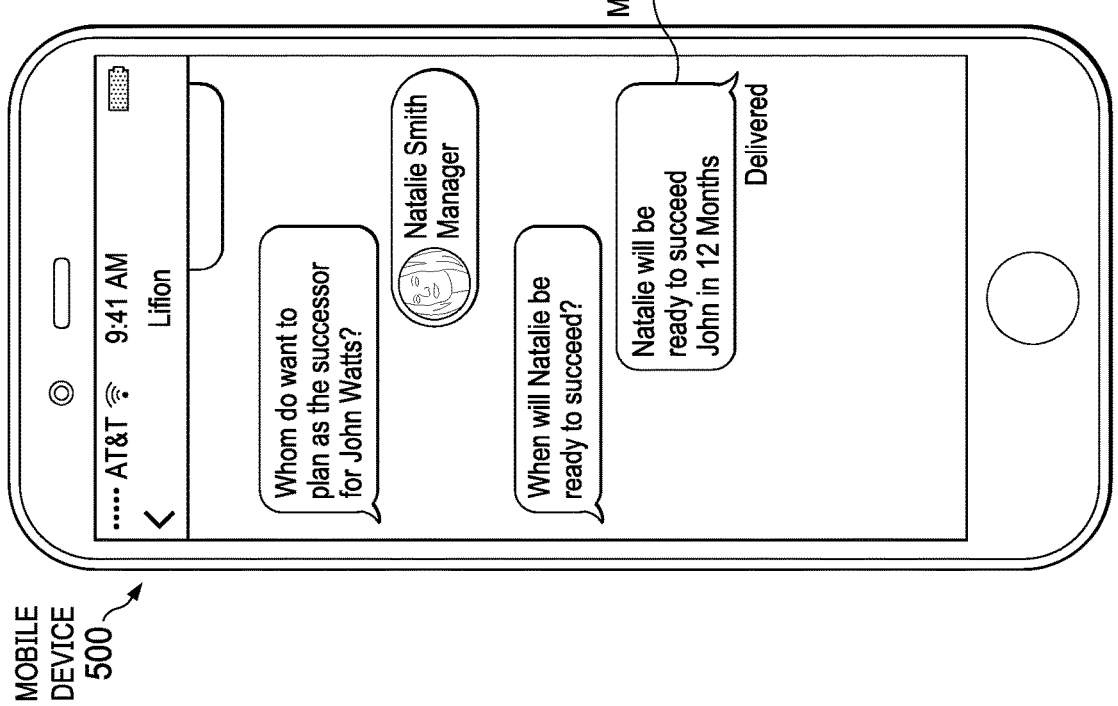

Referring now specifically to FIG. 5A, chat message 502 and chat message 504 are displayed in chat interface 518. Chat interface 518 is an example of chat interface 146 of FIG. 1. A mobile application executing on mobile device 500 displays chat message 502 in response to a selection of a human resources operation, such as through interaction with graphical elements of operations interface 402 of FIG.

4. Chat message 502 is generated by a logic flow service according to a chat flow, such as logic flow service 210 and chat flow 218 of FIG. 2. As depicted, chat message 502 requests input for performing the selected human resources operation according to a corresponding business rule, such as business rule 135 of FIG. 1. In response to chat message 502, a user of mobile device 500 sends chat message 504. As depicted, chat message 504 supplies the requested input for performing the selected human resources operation according to the corresponding business rule.

As shown in FIGS. 5B-5H, the chat wizard generates additional chat messages 506-508 according to the corresponding chat flow. Chat messages 506-508 request input needed to perform the selected human resources operation according to the corresponding business rule. In response, a user of mobile device 500 can supply the requested input through chat messages 510-514. The chat wizard can generate chat message 516 at the conclusion of the chat flow, confirming the performance of the human resources operation.

With reference next to FIGS. 6A-D, a sequential series of chat messages in the context of an employee performance review human resources operation is depicted in accordance with an illustrative embodiment. Mobile device 600 is an example of mobile device 116, shown in block form in FIG. 1. Chat messages 602-612 are examples of chat messages 144, shown in block form in FIG. 1.

Figure 6B:
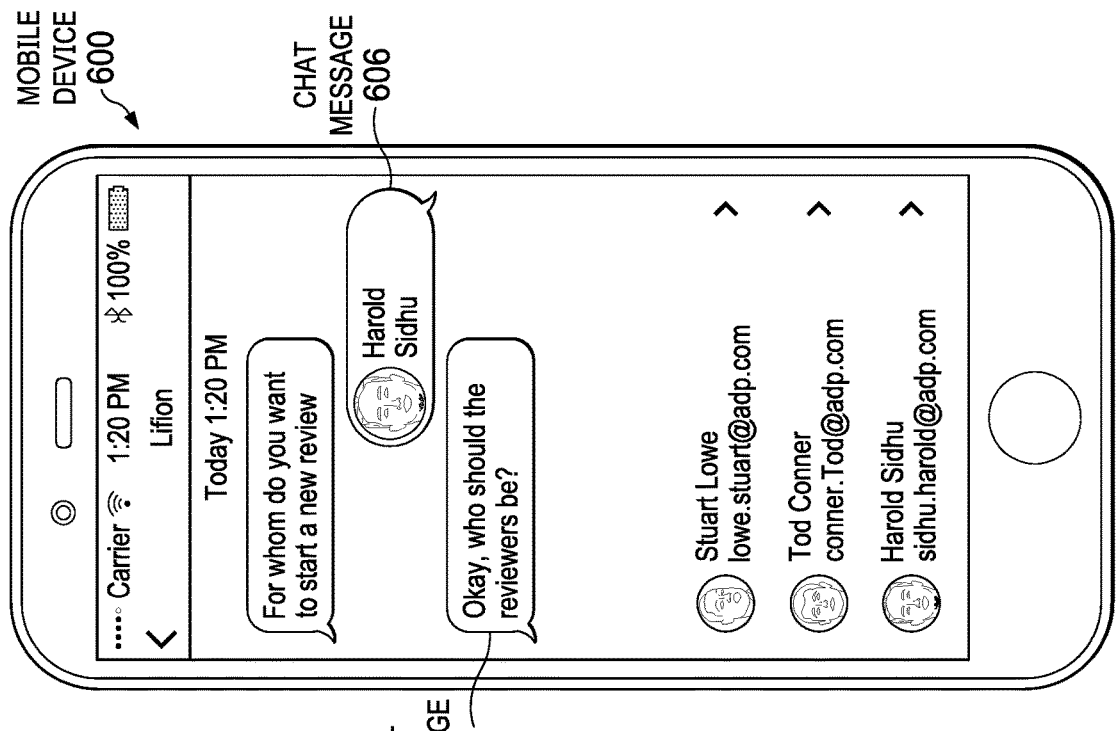
FIGS. 6A-D are a sequential series of chat messages in a context of an employee performance review human resources operation in accordance with an illustrative embodiment.
Figure 6A:
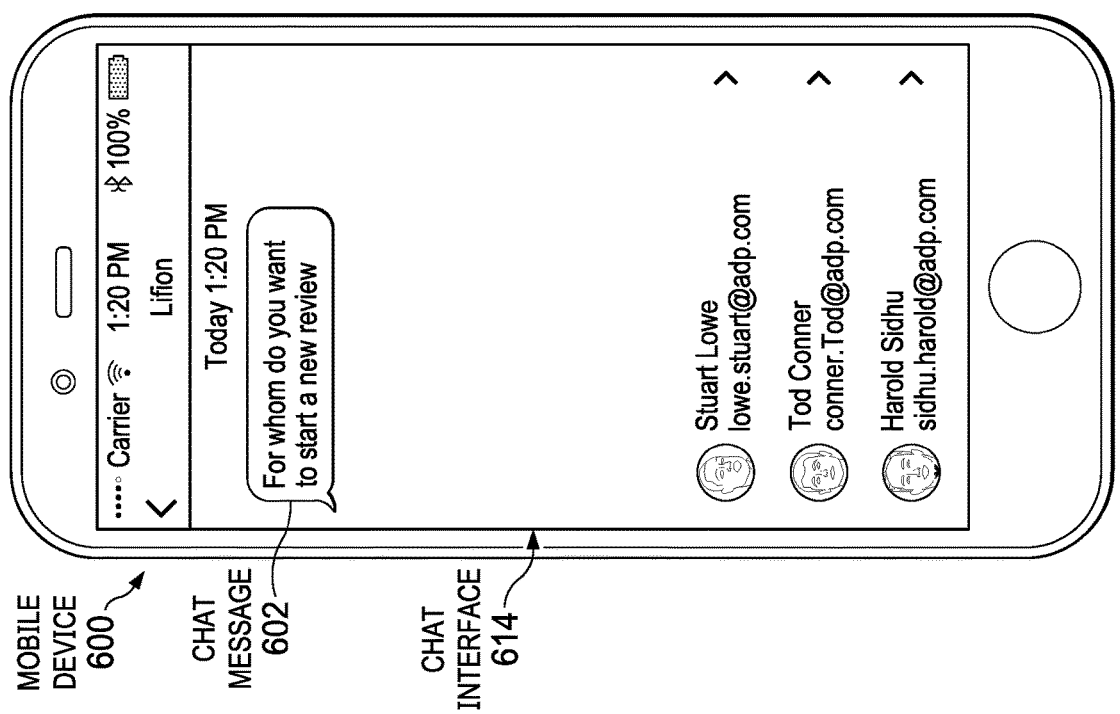

Referring now specifically to FIG. 6A, chat message 602 is displayed in chat interface 614. Chat interface 614 is an example of chat interface 146 of FIG. 1. A mobile application executing on mobile device 600 displays chat message 602 in response to a selection of a human resources operation, such as through interaction with graphical elements of operations interface 402 of FIG. 4. Chat message 602 is generated by a logic flow service according to a chat flow, such as logic flow service 210 and chat flow 218 of FIG. 2, respectively. As depicted, chat message 602 requests input for performing the selected human resources operation according to a corresponding business rule, such as business rule 135 of FIG. 1.

Figure 6D:
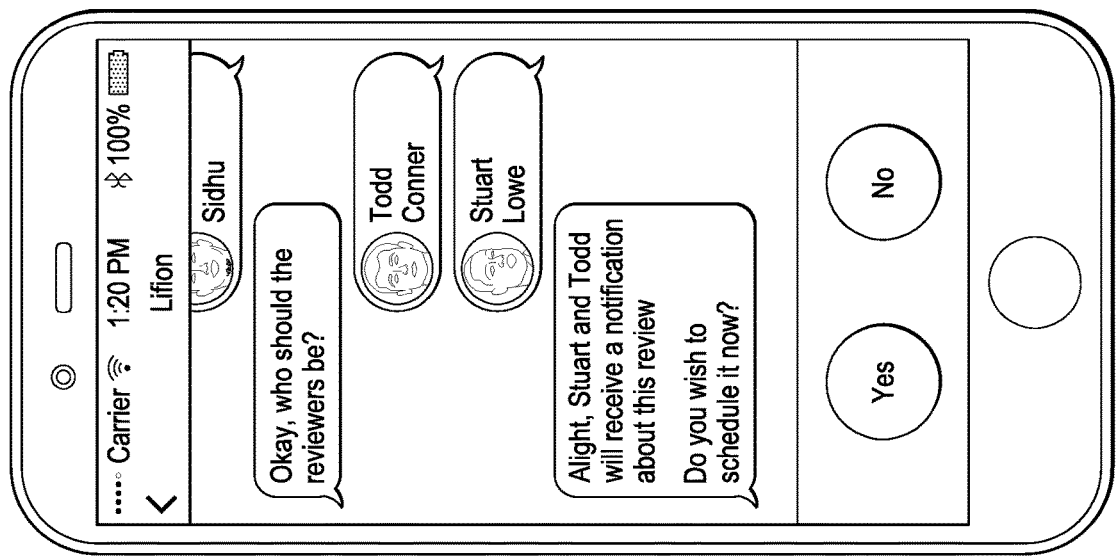
Figure 6C:
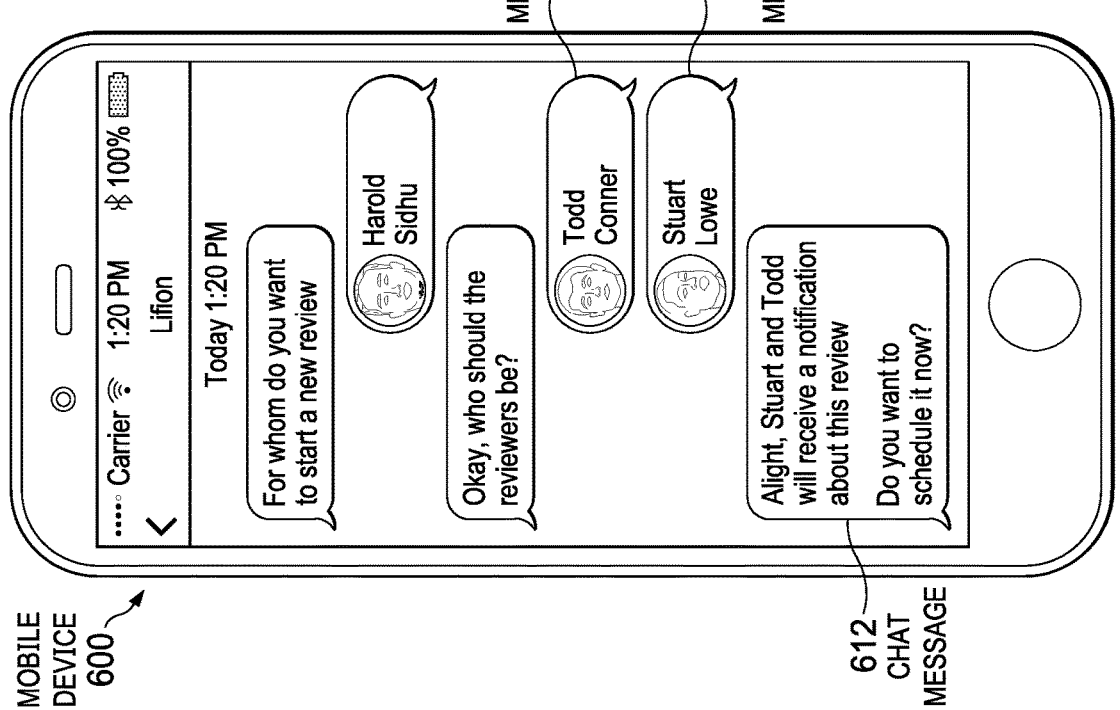

As shown in FIGS. 6B-6D, the chat wizard generates additional chat message 604 according to the corresponding chat flow. Chat message 604 requests input needed to perform the selected human resources operation according to the corresponding business rule. In response, a user of mobile device 600 can supply the requested input through chat messages 606-610. The chat wizard can generate chat message 612 at the conclusion of the chat flow, confirming the performance of the human resources operation.

Figure 7B:
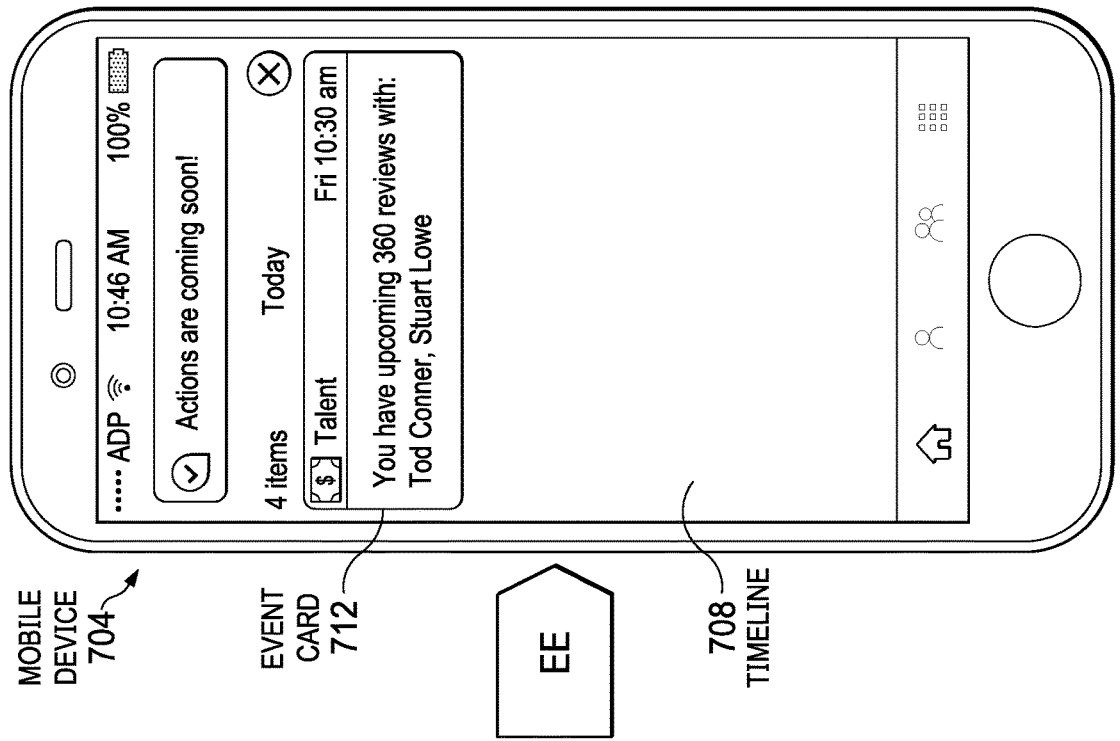
FIGS. 7A-7B are a set of mobile devices displaying workflow stage notifications on timelines in a context of an employee performance review human resources operation in accordance with an illustrative embodiment.
Figure 7A:
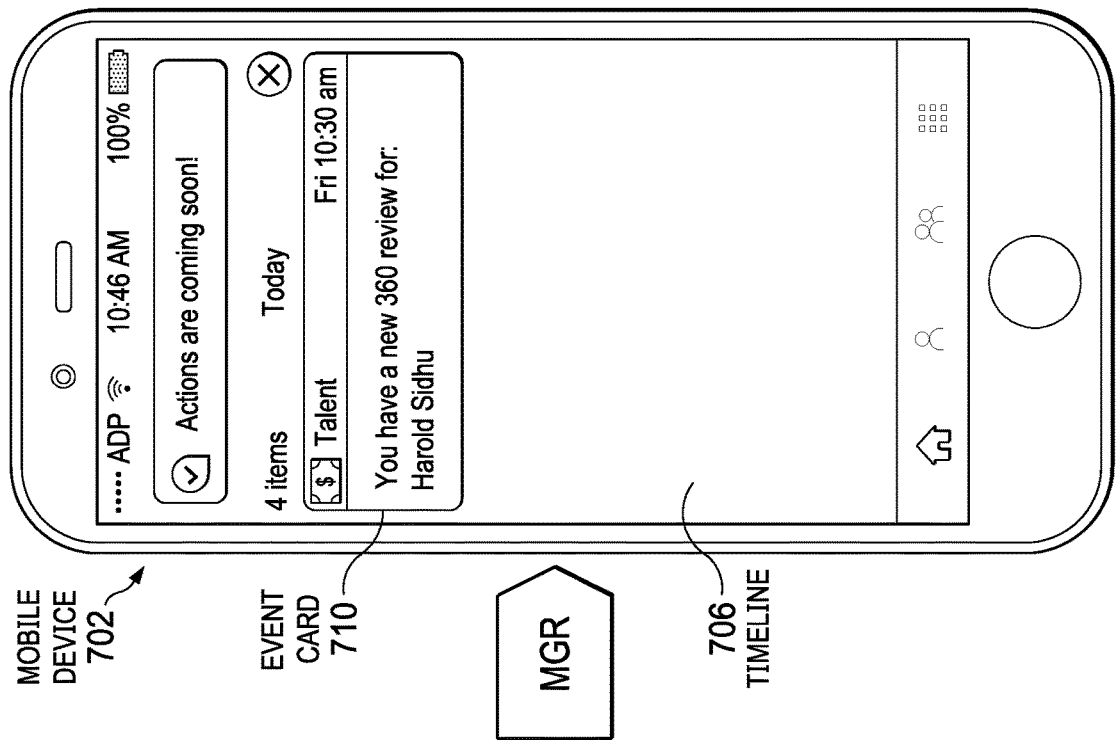

With reference next to FIGS. 7A-7B, a set of mobile devices displaying workflow stage notifications on timelines in a context of an employee performance review human resources operation is depicted in accordance with an illustrative embodiment. Mobile devices 702 and 704 are examples of set of mobile devices 154, shown in block form in FIG. 1.

As depicted, mobile devices 702 and 704 chronologically display workflow stage notifications in timelines 706 and 708, respectively. Timelines 706 and 708 are examples of timeline 156, shown in block form in FIG. 1. In this illustrative example, workflow stage notifications are displayed as event cards 710 and 712. Users of the respected mobile devices can then interact with event cards 710 and 712 to advance the human resources operation according to the associated business rules.

Figure 8:
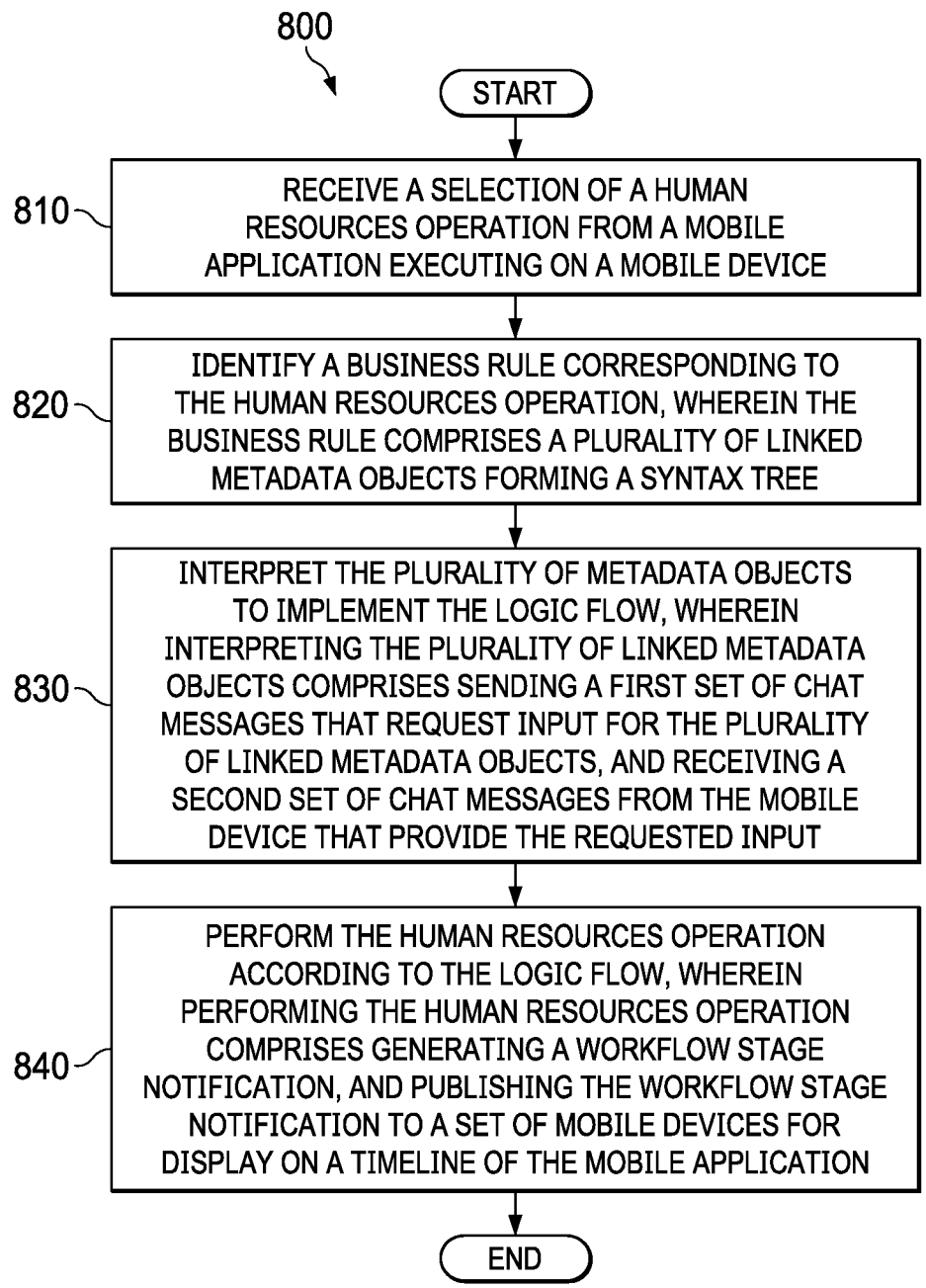
FIG. 8 is an illustration of a flowchart of a process for digitally manipulating a human resources workflow on a mobile device in accordance with an illustrative embodiment.

With reference next to FIG. 8, a flowchart of a process for digitally manipulating a human resources workflow on a mobile device is depicted in accordance with an illustrative embodiment. Process 800 may be implemented in computer system 110 of FIG. 1. For example, process 800 may be implemented as operations performed by logic flow 140, shown in block form in FIG. 1.

The process begins by receiving a selection of a human resources operation from a mobile application executing on a mobile device (step 810). The selection can be, for example, selection 122 of human resources operations 118 selected from operations interface 126, all shown in FIG. 1.

The process then identifies a logic flow with a mobile signature corresponding to the human resources operation (step 820). The logic flow comprises a plurality of linked metadata objects forming a syntax tree.

The process then interprets the plurality of linked metadata objects to implement the logic flow (step 830). Interpreting the plurality of linked metadata objects comprises sending, to the mobile device, a first set of chat messages that request input for the plurality of linked metadata objects. Interpreting the plurality of linked metadata objects further comprises receiving a second set of chat messages from the mobile device that provide the requested input. The first set of chat messages and second set of chat messages can be, for example, chat messages 144 of FIG. 1.

The process then performs the human resources operation according to the logic flow (step 840), with the process terminating thereafter. Performing the human resources operation comprises generating a workflow stage notification. Performing the human resources operation further comprises publishing the workflow stage notification to a set of mobile devices for display on a timeline of the mobile application.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
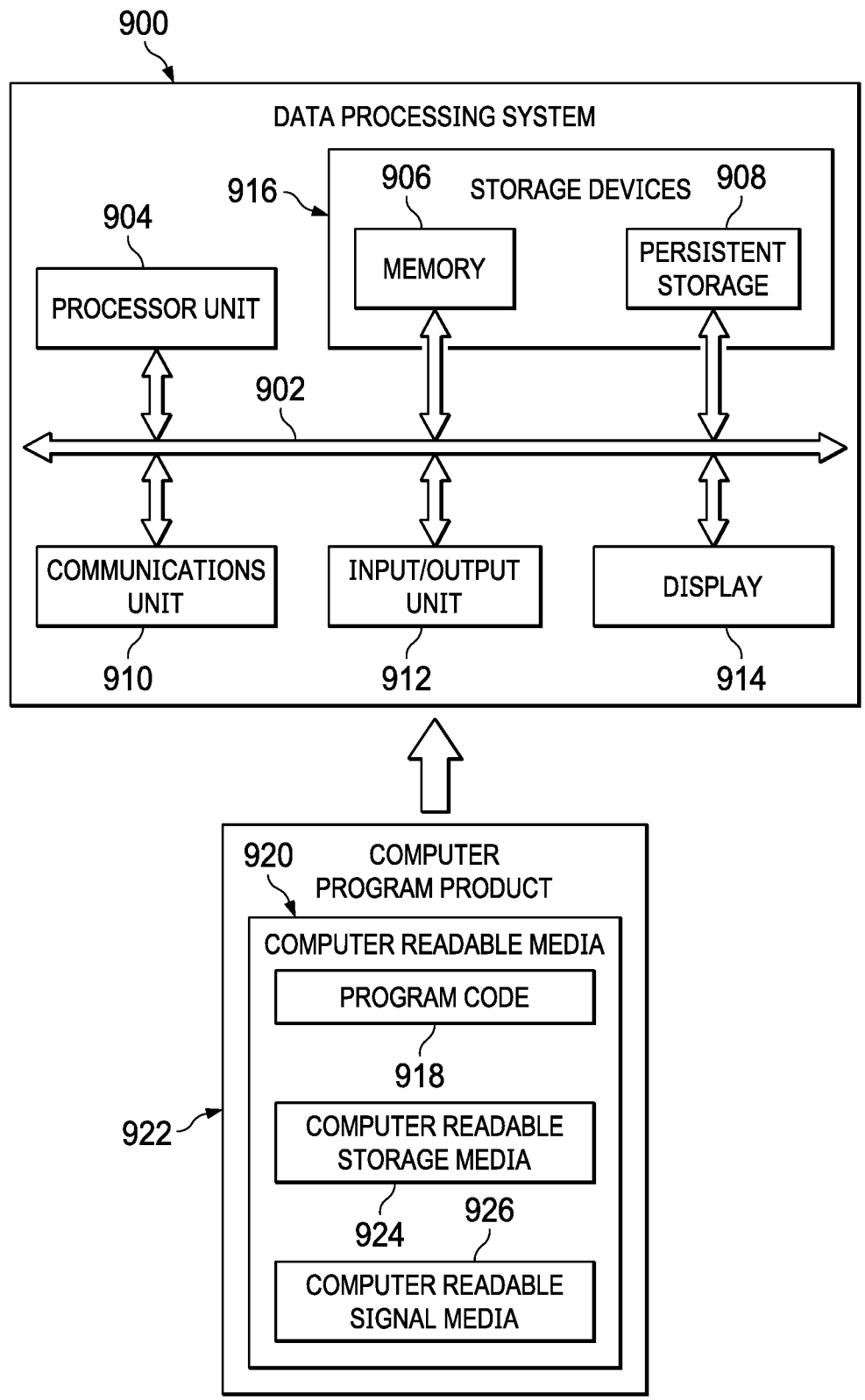
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be used to implement one or more computers and computer system 110 in FIG. 1. In this illustrative example, data processing system 900 includes communications framework 902, which provides communications between processor unit 904, memory 914, persistent storage 916, communications unit 908, input/output unit 910, and display 912. In this example, communications framework 902 may take the form of a bus system.

Processor unit 904 serves to execute instructions for software that may be loaded into memory 914. Processor unit 904 may be a number of processors, a multi-processor core, or some other type of processor, depending on the particular implementation.

Memory 914 and persistent storage 916 are examples of storage devices 906. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 906 may also be referred to as computer-readable storage devices in these illustrative examples. Memory 914, in these examples, may be, for example, a random access memory or any other suitable volatile or non-volatile storage device. Persistent storage 916 may take various forms, depending on the particular implementation.

For example, persistent storage 916 may contain one or more components or devices. For example, persistent storage 916 may be a hard drive, a flash memory, a rewritable optical disk, a rewritable magnetic tape, or some combination of the above. The media used by persistent storage 916 also may be removable. For example, a removable hard drive may be used for persistent storage 916.

Communications unit 908, in these illustrative examples, provides for communications with other data processing systems or devices. In these illustrative examples, communications unit 908 is a network interface card.

Input/output unit 910 allows for input and output of data with other devices that may be connected to data processing system 900. For example, input/output unit 910 may provide a connection for user input through at least of a keyboard, a mouse, or some other suitable input device. Further, input/output unit 910 may send output to a printer. Display 912 provides a mechanism to display information to a user.

Instructions for at least one of the operating system, applications, or programs may be located in storage devices 906, which are in communication with processor unit 904 through communications framework 902. The processes of the different embodiments may be performed by processor unit 904 using computer-implemented instructions, which may be located in a memory, such as memory 914.

These instructions are referred to as program code, computer-usable program code, or computer-readable program code that may be read and executed by a processor in processor unit 904. The program code in the different embodiments may be embodied on different physical or computer-readable storage media, such as memory 914 or persistent storage 916.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 920 may be computer-readable storage media 924 or computer-readable signal media 926.

In these illustrative examples, computer-readable storage media 924 is a physical or tangible storage device used to store program code 918 rather than a medium that propagates or transmits program code 918. Alternatively, program code 918 may be transferred to data processing system 900 using computer-readable signal media 926.

Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for digitally manipulating a human resources workflow on a mobile device, the method comprising:

receiving, by a logic flow using a metadata mobile structure and a chat flow, a selection of a human resources operation from a mobile application executing on the mobile device;

identifying, by the logic flow using a logic flow service, a business rule corresponding to the human resources operation, wherein the business rule comprises a plurality of linked metadata objects forming a syntax tree;

interpreting, by the logic flow using a service orchestration, the plurality of linked metadata objects to implement the business rule, wherein interpreting the plurality of linked metadata objects comprises:

sending, using the metadata mobile structure and the chat flow, to the mobile device, a first set of chat messages that request input for the plurality of linked metadata objects; and receiving, using the metadata mobile structure and the chat flow, a second set of chat messages from the mobile device that provide the requested input; and performing, by the logic flow using the service orchestration, the human resources operation according to the business rule, wherein performing the human resources operation comprises:

generating, using the logic flow service, a workflow stage notification; and publishing, using the metadata mobile structure and the chat flow, the workflow stage notification to a set of mobile devices for display on a timeline of the mobile application using a graphical user interface of the mobile device, wherein the plurality of linked metadata objects is a first plurality of linked metadata objects forming a first syntax tree, the method further comprising:
identifying a chat flow corresponding to the human resources operation, wherein the chat flow comprises a second plurality of linked metadata objects forming a second syntax tree; and
interpreting the second plurality of linked metadata objects to generate the first set of chat messages, further comprising:
parsing the first plurality of linked metadata objects to dynamically generate the first syntax tree from the first plurality of linked metadata objects; and
parsing the second plurality of linked metadata objects to dynamically generate the second syntax tree from the second plurality of linked metadata objects.

2. The method of claim 1, wherein the mobile application is configured to chronologically display the workflow stage notification in the timeline as one of a set of event cards.

3. The method of claim 2, wherein the business rule is implemented inside of a business rule context defined at a beginning of an interpretation step for the first plurality of linked metadata objects, wherein the business rule context is a target object for all symbols defined in a course of implementing the business rule, as well as for all input to and output from the business rule; and
wherein the chat flow is implemented inside of a chat flow context defined at a beginning of an interpretation step for the second plurality of linked metadata objects, wherein the chat flow context is a target object for all symbols defined in a course of implementing the chat flow, as well as for all input to and output from the chat flow.

4. The method of claim 3, wherein interpreting the plurality of linked metadata objects further comprises:
entering the syntax tree and the requested input into an abstract syntax tree interpreter, wherein a compiler operation to generate computer code for implementing the business rule is avoided, and wherein executing the abstract syntax tree interpreter produces a result without using executable code to achieve the result.

5. The method of claim 1, wherein the business rule is implemented inside of a business rule context defined at a beginning of an interpretation step for the first plurality of linked metadata objects, wherein the business rule context is a target object for all symbols defined in a course of implementing the business rule, as well as for all input to and output from the business rule; and
wherein the chat flow is implemented inside of a chat flow context defined at a beginning of an interpretation step for the second plurality of linked metadata objects, wherein the chat flow context is a target object for all symbols defined in a course of implementing the chat flow, as well as for all input to and output from the chat flow.

6. The method of claim 5, wherein interpreting the plurality of linked metadata objects further comprises:
entering the syntax tree and the requested input into an abstract syntax tree interpreter, wherein a compiler operation to generate computer code for implementing the business rule is avoided, and wherein executing the abstract syntax tree interpreter produces a result without using executable code to achieve the result.

7. The method of claim 1, wherein interpreting the plurality of linked metadata objects further comprises:
generating an output for the business rule within a business rule context; and
wherein performing the human resources operation further comprises:
providing the output to a consuming service for performing the human resources operation according to the business rule.

8. A computer system comprising:
a hardware processor; and
a business rule system in communication with the hardware processor, wherein the business rule system is configured:
to receive, by a logic flow using a metadata mobile structure and a chat flow, a selection of a human resources operation from a mobile application executing on a mobile device;
to identify, by the logic flow using a logic flow service, a business rule corresponding to the human resources operation, wherein the business rule comprises a plurality of linked metadata objects forming a syntax tree;
to interpret, by the logic flow using a service orchestration, the plurality of linked metadata objects to implement the business rule, wherein interpreting the plurality of linked metadata objects comprises:
to send, using the metadata mobile structure and the chat flow, to the mobile device, a first set of chat messages that request input for the plurality of linked metadata objects; and
to receive, using the metadata mobile structure and the chat flow, a second set of chat messages from the mobile device that provide the requested input; and
to perform, by the logic flow using the service orchestration, the human resources operation according to the business rule, wherein performing the human resources operation comprises:
to generate, using the logic flow service, a workflow stage notification; and
to publish, using the metadata mobile structure and the chat flow, the workflow stage notification to a set of mobile devices for display on a timeline of the mobile application using a graphical user interface of the mobile device,
wherein the plurality of linked metadata objects is a first plurality of linked metadata objects forming a first syntax tree, wherein the business rule system is further configured:
to identify a chat flow corresponding to the human resources operation, wherein the chat flow comprises a second plurality of linked metadata objects forming a second syntax tree; and
to interpret the second plurality of linked metadata objects to generate the first set of chat messages, further comprising:
parsing the first plurality of linked metadata objects to dynamically generate the first syntax tree from the first plurality of linked metadata objects; and
parsing the second plurality of linked metadata objects to dynamically generate the second syntax tree from the second plurality of linked metadata objects.

9. The computer system of claim 8, wherein the mobile application is configured to chronologically display the workflow stage notification in the timeline as one of a set of event cards.

10. The computer system of claim 9, wherein the business rule is implemented inside of a business rule context defined at a beginning of an interpretation step for the first plurality of linked metadata objects, wherein the business rule context is a target object for all symbols defined in a course of implementing the business rule, as well as for all input to and output from the business rule; and wherein the chat flow is implemented inside of a chat flow context defined at a beginning of an interpretation step for the second plurality of linked metadata objects, wherein the chat flow context is a target object for all symbols defined in a course of implementing the chat flow, as well as for all input to and output from the chat flow.

11. The computer system of claim 10, wherein interpreting the plurality of linked metadata objects further comprises:

entering the syntax tree and the requested input into an abstract syntax tree interpreter, wherein a compiler operation to generate computer code for implementing the business rule is avoided, and wherein executing the abstract syntax tree interpreter produces a result without using executable code to achieve the result.

12. The computer system of claim 8, wherein the business rule is implemented inside of a business rule context defined at a beginning of an interpretation step for the first plurality of linked metadata objects, wherein the business rule context is a target object for all symbols defined in a course of implementing the business rule, as well as for all input to and output from the business rule; and wherein the chat flow is implemented inside of a chat flow context defined at a beginning of an interpretation step for the second plurality of linked metadata objects, wherein the chat flow context is a target object for all symbols defined in a course of implementing the chat flow, as well as for all input to and output from the chat flow.

13. The computer system of claim 12, wherein interpreting the plurality of linked metadata objects further comprises:

entering the syntax tree and the requested input into an abstract syntax tree interpreter, wherein a compiler operation to generate computer code for implementing the business rule is avoided, and wherein executing the abstract syntax tree interpreter produces a result without using executable code to achieve the result.

14. The computer system of claim 8, wherein interpreting the plurality of linked metadata objects further comprises:

generating an output for the business rule within a business rule context; and wherein performing the human resources operation further comprises:

providing the output to a consuming service for performing the human resources operation according to the business rule.

15. A computer program product for digitally manipulating a human resources workflow on a mobile device, the computer program product comprising:

a computer readable storage media;

program code, stored on the computer readable storage media, for receiving, by a logic flow using a metadata mobile structure and a chat flow, a selection of a human resources operation from a mobile application executing on the mobile device;

program code, stored on the computer readable storage media, for identifying, by the logic flow using a logic flow service, a business rule corresponding to the human resources operation, wherein the business rule comprises a plurality of linked metadata objects forming a syntax tree;

program code, stored on the computer readable storage media, for interpreting, by the logic flow using a service orchestration, the plurality of linked metadata objects to implement the business rule, wherein the program code for interpreting the plurality of linked metadata objects comprises:

program code for sending, using the metadata mobile structure and the chat flow, to the mobile device, a first set of chat messages that request input for the plurality of linked metadata objects; and program code for receiving, using the metadata mobile structure and the chat flow, a second set of chat messages from the mobile device that provide the requested input; and program code, stored on the computer readable storage media, for performing, by the logic flow using the service orchestration, the human resources operation according to the business rule, wherein the program code for performing the human resources operation comprises:

program code for generating, using the logic flow service, a workflow stage notification; and program code for publishing, using the metadata structure and the chat flow, the workflow stage notification to a set of mobile devices for display on a timeline of the mobile application using a graphical user interface of the mobile device, wherein the plurality of linked metadata objects is a first plurality of linked metadata objects forming a first syntax tree, the computer program product further comprising:

program code, stored on the computer readable storage media, for identifying a chat flow corresponding to the human resources operation, wherein the chat flow comprises a second plurality of linked metadata objects forming a second syntax tree; and program code, stored on the computer readable storage media, for interpreting the second plurality of linked metadata objects to generate the first set of chat messages, further comprising:

program code, stored on the computer readable storage media, for parsing the first plurality of linked metadata objects to dynamically generate the first syntax tree from the first plurality of linked metadata objects; and program code, stored on the computer readable storage media, for parsing the second plurality of linked metadata objects to dynamically generate the second syntax tree from the second plurality of linked metadata objects.

16. The computer program product of claim 15, wherein the mobile application is configured to chronologically display the workflow stage notification in the timeline as one of a set of event cards.

17. The computer program product of claim 16, wherein the business rule is implemented inside of a business rule context defined at a beginning of an interpretation step for the first plurality of linked metadata objects, wherein the business rule context is a target object for all symbols defined in a course of implementing the business rule, as well as for all input to and output from the business rule; and wherein the chat flow is implemented inside of a chat flow context defined at a beginning of an interpretation step for the second plurality of linked metadata objects, wherein the chat flow context is a target object for all symbols defined in a course of implementing the chat flow, as well as for all input to and output from the chat flow.

18. The computer program product of claim 17, wherein the program code for interpreting the plurality of linked metadata objects further comprises:
    program code, stored on the computer readable storage media, for entering the syntax tree and the requested input into an abstract syntax tree interpreter, wherein a compiler operation to generate computer code for implementing the business rule is avoided, and wherein executing the abstract syntax tree interpreter produces a result without using executable code to achieve the result.

19. The computer program product of claim 15, wherein the business rule is implemented inside of a business rule context defined at a beginning of an interpretation step for the first plurality of linked metadata objects, wherein the business rule context is a target object for all symbols defined in a course of implementing the business rule, as well as for all input to and output from the business rule; and
    wherein the chat flow is implemented inside of a chat flow context defined at a beginning of an interpretation step for the second plurality of linked metadata objects, wherein the chat flow context is a target object for all symbols defined in a course of implementing the chat flow, as well as for all input to and output from the chat flow.

20. The computer program product of claim 19, wherein the program code for interpreting the plurality of linked metadata objects further comprises:
    program code, stored on the computer readable storage media, for entering the syntax tree and the requested input into an abstract syntax tree interpreter, wherein a compiler operation to generate computer code for implementing the business rule is avoided, and wherein executing the abstract syntax tree interpreter produces a result without using executable code to achieve the result.

21. The computer program product of claim 15, wherein the program code for interpreting the plurality of linked metadata objects further comprises:
    program code, stored on the computer readable storage media, for generating an output for the business rule within a business rule context; and
    wherein performing the human resources operation further comprises:
        program code for providing the output to a consuming service for performing the human resources operation according to the business rule.

* * * * *